US012731296B2

(12) United States Patent
Zhang et al.

(10) Patent No.: US 12,731,296 B2
(45) Date of Patent: Sep. 8, 2026

(54) ENCODER AND DECODER AND METHODS FOR ENCODING AND DECODING POINT ATTRIBUTES ASSOCIATED TO POINT OF POINT CLOUD

(71) Applicants: Beijing Xiaomi Mobile Software Co., Ltd., Beijing (CN); Xidian University, Xi'an (CN)

(72) Inventors: Wei Zhang, Xi'an (CN); Mary-Luc Georges Henry Champel, Beijing (CN); Shuo Gao, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 311 days.

(21) Appl. No.: 18/575,548

(22) PCT Filed: Jul. 2, 2021

(86) PCT No.: PCT/CN2021/104335

§ 371 (c)(1),
(2) Date: Dec. 29, 2023

(87) PCT Pub. No.: WO2023/272730

PCT Pub. Date: Jan. 5, 2023

(65) Prior Publication Data

US 2024/0312064 A1 Sep. 19, 2024

(51) Int. Cl.
*G06T 9/00* (2006.01)
*H04N 19/105* (2014.01)
(Continued)

(52) U.S. Cl.
CPC .............. *G06T 9/001* (2013.01); *G06T 9/004* (2013.01); *H04N 19/105* (2014.11); (Continued)

(58) Field of Classification Search
CPC ...................... G06T 9/00–40; H04N 19/00–99
See application file for complete search history.

(56) References Cited

U.S. PATENT DOCUMENTS

2019/0075320 A1* 3/2019 Mammou ............ H04N 19/597
2020/0311984 A1 10/2020 Yea et al.
(Continued)

FOREIGN PATENT DOCUMENTS

CN 109889840 A 6/2019
CN 113453018 B * 5/2022 ........... H04N 19/176
JP 115086658 B * 7/2023

OTHER PUBLICATIONS

Notice of Reasons for Refusal issued by the Japanese Patent Office on Dec. 10, 2024, in corresponding Application No. JP 2023-580948, 10 pages.

(Continued)

*Primary Examiner* — Scott A Rogers
(74) *Attorney, Agent, or Firm* — Finnegan, Henderson, Farabow, Garrett & Dunner, L.L.P.

(57) ABSTRACT

A method for encoding, in a bitstream, point attributes associated to a point of a point cloud, includes: determining, for a point P to be encoded to the bitstream, a predictor list of k predictor points of the point cloud including k points of the point cloud nearest to the point P to be encoded, wherein the k points are selected according to their relative position to each other; and encoding the point attributes associated to the point P to be encoded by predictive encoding based on attributes of the predictor points of the predictor list.

17 Claims, 6 Drawing Sheets

(51) Int. Cl.
*H04N 19/184* (2014.01)
*H04N 19/597* (2014.01)
*H04N 19/70* (2014.01)
*H04N 19/96* (2014.01)

(52) U.S. Cl.
CPC ......... *H04N 19/184* (2014.11); *H04N 19/597* (2014.11); *H04N 19/70* (2014.11); *H04N 19/96* (2014.11)

(56) References Cited

U.S. PATENT DOCUMENTS

2022/0005230 A1* 1/2022 Li ............................ G06T 7/75
2024/0185470 A1* 6/2024 Ramasubramonian ...................... H04N 19/597
2024/0314359 A1* 9/2024 Xu .......................... G06T 9/001
2024/0320866 A1* 9/2024 Xu ....................... H04N 19/105
2024/0348772 A1* 10/2024 Wang ................... H04N 19/139
2024/0357172 A1* 10/2024 Xu ....................... H04N 19/159
2024/0357174 A1* 10/2024 Xu .......................... G06T 9/004
2025/0039448 A1* 1/2025 Xu ....................... H04N 19/107
2025/0142121 A1* 5/2025 Xu ....................... H04N 19/137

OTHER PUBLICATIONS

International Search Report of International Application No. PCT/CN2021/104335, dated Mar. 24, 2022, 3 pages.

* cited by examiner

ENCODER AND DECODER AND METHODS FOR ENCODING AND DECODING POINT ATTRIBUTES ASSOCIATED TO POINT OF POINT CLOUD

CROSS-REFERENCE TO RELATED APPLICATION

The present application is a US national phase application of International Application PCT/CN2021/104335, filed Jul. 2, 2021, the entire content of which is incorporated herein by reference.

TECHNICAL FIELD

The present application generally relates to compression of attributes of points of a point cloud, and in particular, to a method of encoding and decoding, as well as an encoder and decoder for improved coding of attributes of a point cloud.

BACKGROUND

As a format for the representation of 3D data, point clouds have recently gained traction as they are versatile in their capability in representing all types of 3D objects or scenes. Therefore, many use cases can be addressed by point clouds, among which are

- movie post-production,
- real-time 3D immersive telepresence or VR/AR applications,
- free viewpoint video (for instance for sports viewing),
- Geographical Information Systems (aka cartography),
- culture heritage (storage of scans of rare objects into a digital form),
- Autonomous driving, including 3D mapping of the environment and real-time Lidar data acquisition.

A point cloud is a set of points located in a 3D space, optionally with additional values attached to each of the points. These additional values are usually called point attributes. Consequently, a point cloud is combination of a geometry (the 3D position of each point) and attributes.

Attributes may be, for example, three-component colors, material properties like reflectance and/or two-component normal vectors to a surface associated with the point.

Point clouds may be captured by various types of devices like an array of cameras, depth sensors, Lidars, scanners, or may be computer-generated (in movie post-production for example). Depending on the use cases, point clouds may have from thousands to up to billions of points for example for cartography applications.

Raw representations of point clouds require a very high number of bits per point, with at least a dozen of bits per spatial component X, Y or Z, and optionally more bits for the attribute, for example three times 10 bits for the colors. Practical deployment of point-cloud-based applications requires compression technologies that enable the storage and distribution of point clouds with reasonable storage and transmission infrastructures.

Compression may be lossy (like in video compression) for the distribution to and visualization by an end-user, for example on AR/VR glasses or any other 3D-capable device. Other use cases do require lossless compression, like medical applications or autonomous driving, to avoid altering the results of a decision obtained from the analysis of the compressed and transmitted point cloud.

present disclosure

SUMMARY

In a first of the present disclosure a method is provided for encoding, in a bitstream, point attributes associated to a point of a point cloud. The method includes:

- for a point P to be encoded to the bitstream determining a predictor list of k predictor points of the point cloud including the points of the point cloud nearest to the point P to be encoded which are selected according to their relative position to each other; and
- encoding the point attributes associated to the point P to be encoded by predictive encoding based on attributes of the predictor points of the predictor list.

In a second of the present disclosure a method is provided for decoding, from a bitstream, point attributes associated to a point of a point cloud, including:

- for a point P to be decoded to the bitstream determining a predictor list of k predictor points of the point cloud including the points of the point cloud nearest to the point P to be decoded which are selected according to their relative position to each other; and
- decoding the point attributes associated to the point P to be decoded by predictive decoding based on attributes of the predictor points of the predictor list.

In a third of the present disclosure an encoder is provided for encoding, in a bitstream, point attributes associated to a point of a point cloud, including: a processor and a memory storage device, wherein in the memory storage device instructions executable by the processor are stored that, when executed, cause the processor to perform the method for encoding described above.

In a fourth of the present disclosure a decoder is provided for decoding, in a bitstream, point attributes associated to a point of a point cloud, including: a processor and a memory storage device, wherein in the memory storage device instructions executable by the processor are stored that, when executed, cause the processor to perform the method described above.

BRIEF DESCRIPTION OF THE DRAWINGS

Reference will now be made, by way of example, to the accompanying drawings which show example embodiments of the present application, and in which the Figures show.

DETAILED DESCRIPTION OF THE EMBODIMENTS

Figure 1:
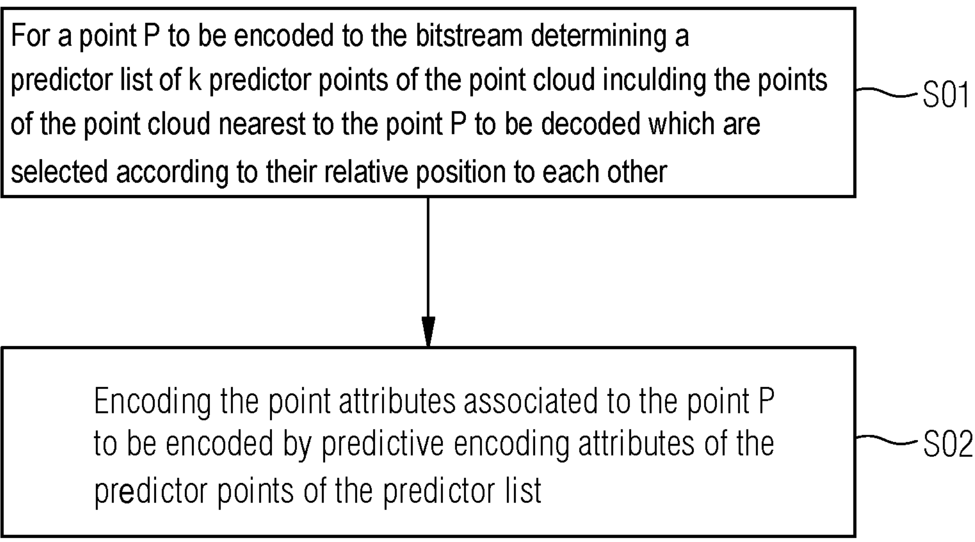
FIG. 1 illustrates a flow diagram of a method for encoding according to an embodiment.

Until recently, point cloud compression (aka PCC) was not addressed by the mass market and no standardized point cloud codec was available. In 2017, the standardization working group ISO/JCT1/SC29/WG11, also known as Moving Picture Experts Group or MPEG, has initiated work items on point cloud compression. This has led to two standards, namely

- MPEG-I part 5 (ISO/IEC 23090-5) or Video-based Point Cloud Compression (V-PCC)
- MPEG-I part 9 (ISO/IEC 23090-9) or Geometry-based Point Cloud Compression (G-PCC) Both V-PCC and G-PCC standards have finalized their first version in late 2020 and will soon be available to the market.

The V-PCC coding method compresses a point cloud by performing multiple projections of a 3D object to obtain 2D patches that are packed into an image (or a video when dealing with moving point clouds). Obtained images or videos are then compressed using already existing image/video codecs, allowing for the leverage of already deployed image and video solutions. By its very nature, V-PCC is efficient only on dense and continuous point clouds because image/video codecs are unable to compress non-smooth patches as would be obtained from the projection of, for example, Lidar-acquired sparse geometry data.

The G-PCC coding method has two schemes for the compression of the geometry.

The first scheme is based on an occupancy tree (octree/quadtree/binary tree) representation of the point cloud geometry. Occupied nodes are split down until a certain size is reached, and occupied leaf nodes provide the location of points, typically at the center of these nodes. By using neighbor-based prediction techniques, high level of compression can be obtained for dense point clouds. Sparse point clouds are also addressed by directly coding the position of point within a node with non-minimal size, by stopping the tree construction when only isolated points are present in a node; this technique is known as Direct Coding Mode (DCM).

The second scheme is based on a predictive tree, each node representing the 3D location of one point and the relation between nodes is spatial prediction from parent to children. This method can only address sparse point clouds and offers the advantage of lower latency and simpler decoding than the occupancy tree. However, compression performance is only marginally better, and the encoding is complex, relatively to the first occupancy-based method, intensively looking for the best predictor (among a long list of potential predictors) when constructing the predictive tree.

In both schemes, attribute encoding/decoding is performed after complete geometry encoding/decoding, leading to a two-pass coding. Thus, low latency is obtained by using slices that decompose the 3D space into sub-volumes that are coded independently, without prediction between the sub-volumes. This may heavily impact the compression performance when many slides are used.

Points attributes are coded based on coded Geometry coordinates which are used to help in decorrelating the attributes information according to spatial relationship/distances between points. In G-PCC there are mainly two methods for decorrelating and coding attributes: the first one is called RAHT for region adaptive hierarchical transform, and the second one is using one or more level of details (LoDs) and is then sometimes referred to as LoD or as predlift because it can be configured to be used as a predictive decorrelation method or as a lifting based decorrelation method.

With LoD predictive scheme, prediction of an attribute value (a three channels/components color, or a single channel/component reflectance, transparency for instance) of a current decoded point is performed using a weighted prediction from attribute values of the k-nearest (using geometry coordinates) preceding decoded points. The weights in the prediction depends on the spatial distance (according to geometry coordinates) between the current point and each one of the nearest preceding decoded points used in the prediction.

In current G-PCC, the attribute prediction is performed between the current point and its k nearest (in terms of Manhattan distance) neighbors in the same LoD (i.e., intra LoD prediction) and higher LoDs (inter-LoD prediction).

Considering the complex distribution of 3D points, choosing the k nearest points as predictors (i.e., using distance as the only criterion) may not always be optimal. Theoretically, it is often the case that the k nearest neighbors (in distance) are not the k-nearest neighbors with regards to attribute values.

It is an object of the present disclosure to provide an efficient encoding and decoding method, as well as an encoder and decoder to provide improved compression of attributes of a point cloud.

In an aspect of the present disclosure a method is provided for encoding, in a bitstream, point attributes associated to a point of a point cloud. The method includes:

- for a point P to be encoded to the bitstream determining a predictor list of k predictor points of the point cloud including the points of the point cloud nearest to the point P to be encoded which are selected according to their relative position to each other; and
- encoding the point attributes associated to the point P to be encoded by predictive encoding based on attributes of the predictor points of the predictor list.

Thus, for a point P that attributes shall be encoded to the bitstream, a predictor list of k predictor points is determined. Usually, k is equal to 3. Therein, the predictor list includes the k points of the point cloud nearest to the point P to be encoded which are in addition being selected on the basis of their relative geographic position to each other around the point P to be encoded. Thus, the predictor list might not include the nearest k points of the point cloud but, by the method of the present disclosure, a point of the point cloud farther away from the point P to be encoded might be included into the predictor list which results in predictor points of the predictor list to be spreaded around or sufficiently distributed around the point P to be encoded. Thus, one or more points of the k nearest points being nearest to the point P to be encoded might be disregarded and replaced by points which are farther away (geometrically) in the point cloud but provide an improved prediction of the attributes of point P.

In the next step the point attributes associated to the point P to be encoded are encoded by predictive encoding based on the attributes of the predictor points of the predictor list. Thus, the predictor list is used for predictive encoding the attributes of the point P.

Therein, by the selected points of the predictor list, better prediction of the attributes of the point P can be achieved thereby reducing the residual to be encoded thereby reducing the size of the bitstream.

Preferably, determining the predictor list includes:

- determining an initial list of k predictor points P0, . . . , P(k−1) of the point cloud including the k points of the point cloud with nearest geographic positions to the point P to be encoded;
- determining selecting the predictor points of the initial list as predictor list according to their relative position to each other. Thus, in a first step an initial list of k predictor points P0, . . . , P(k−1) of the point cloud is determined wherein the initial list includes the k points of the point cloud being nearest to the point P to be encoded. In a subsequent step the predictor points of the initial list are selected on the basis of their relative position to each other with regards to the point P to be encoded. If spreading or distribution of the initial list is sufficient, the initial list, i.e. the k nearest predictor points of the point cloud are selected leading to a sufficient accuracy of predicting the attributes of the point P to be encoded during predictive encoding of the attributes of point P.

Preferably, the initial list is ordered according to the distance to the point P to be encoded from the nearest point P0 to the farthest point P(k−1).

Preferably, the method includes:

if the predictor points of the initial list are not selected:

determining a candidate list of n predictor points by the k to k+n−1 nearest points Pk, . . . , P(k+n−1) of the point cloud;

replacing at least one predictor point of the initial list by a predictor point of the candidate list to acquire the predictor list; and selecting the predictor points of the acquired list as predictor list according to their relative position to each other.

Therein, preferably, n is between 1 and 10, more preferably between 1 and 5 and most preferably n=3.

Thus, at least one predictor point of the initial list is replaced by a predictor point of the candidate list to acquire a list. Therein, the acquired list is selected to be used for encoding the point attributes associated to the point P to be encoded by predictive encoding on the basis of the geographic positions of the predictor points of the acquired list relative to each other. Thus, one of the k nearest predictor points of the initial list is replaced by a predictor point which is farther away from the point to be encoded in order to gain improved prediction of the attributes of the point P to be encoded.

Preferably, the method includes:

if acquired predictor list is not selected, iteratively replacing at least one predictor point stepwise by each predictor point of the candidate list to acquire a list until the predictor points of the respective list are selected on the basis of the positions of the predictor points of the acquired list relative to each other.

Thus, each predictor point of the candidate list is consecutively considered whether by the respective predictor point of the candidate list spreading or distribution of the initial list can be increased, providing better prediction results for the attributes of the point P to be encoded. Therein, the process might be stopped as soon as one predictor point of the candidate list is found, such that the predictor points of the resulting list are selected.

Preferably, the predictor points of the candidate lists are ordered according to their distance to the point P to be encoded in the order of increasing distance with the point Pk being the nearest point of the candidate list (but still farther away as the last point of the initial list) and P(k+n−1) the farthest predictor point of the candidate list.

Preferably, only the last predictor point of the initial list is replaced. Thus, if the predictor points of the initial list are not selected, only the last predictor point of the initial list is replaced by one of the predictor points of the candidate list. In particular also for the acquired list, acquired by replacing the last predictor point of the initial list or, in an iterative process, by replacing the last predictor point of the acquired list of the previous step, only the last predictor point is replaced by one of the predictor points of the candidate list.

Preferably, k is equal to 2 or larger and more preferably equal to 3. In particular, k=3 is a sufficient compromise between implementation complexity for increasing numbers of k, and sufficient predictability, i.e. sufficient reduction of the respective residuals upon prediction.

Preferably, the space around the point P to be encoded is separated into octants along the X, Y, and Z-axis (used for the geographic positions/coordinates of points) of encoding/decoding, wherein the predictor points are selected if at least two predictor points are located in opposite octants, wherein opposite octants share only the common point P to be encoded.

Thus, a list of predictor points, being the initial list or the predictor list, is considered including predictor points sufficiently spreaded or distributed around the point P to be encoded and thus selected if at least two predictor points of this respective list of predictor points are located in opposite octants. Therein, when considering the relative position to each other of the respective predictor points and selecting those predictor points of the acquired predictor list or the initial list, it is determined whether the respective list includes at least two predictor points which are opposite, i.e. located in opposite octants.

Preferably, the space around the point P to be encoded is separated into octants along the X, Y, and Z-axis of encoding/decoding, wherein the predictor points are selected if at least two predictor points are located in loose opposite octants, wherein loose opposite octants share only one common edge.

Thus, a list of predictor points, being the initial list or the predictor list, is considered including predictor points sufficiently spreaded or distributed around the point P to be encoded and thus selected if at least two predictor points of this respective list of predictor points are located in loose opposite octants. Therein, when considering the relative position to each other of the respective predictor points and selecting those predictor points of the acquired predictor list or the initial list, it is determined whether the respective list includes at least two predictor points which are loose opposite, i.e. located in loose opposite octants.

Preferably, selecting the predictor points of the initial list and/or the predictor list includes:

determining whether at least two predictor points of the initial list or the predictor list are located in opposite octants and subsequently determining whether at least two predictor points of the initial list or the predictor list are located in loose opposite octants. Alternatively, it is determined for a specific predictor point of the candidate list replacing one predictor point of the initial list, whether at least two predictor points of the predictor list are located in opposite octants and subsequently determined whether at least two predictor points of the initial list or the predictor list are located in loose opposite octants. Subsequently the next predictor point of the candidate list might be considered.

Preferably the subsequent determination whether at least two predictor points of the initial list or the predictor list are located in loose opposite octants is only performed when the last two points of the initial list are in the same octant.

Preferably, at least one threshold Ti is defined by Ti=W×dist(P, Pi), with a weight W>1 and Pi a predictor point of the initial list, wherein predictor points of the candidate list are eligible for replacing the at least one predictor point of the initial list if the distance between the predictor point of the candidate list to the point P to be encoded/decoded is smaller than Ti.

Thus, only those predictor points of the candidate list are considered for replacing one or more of the predictor points of the initial list or any former acquired predictor list, if the distance between the respective predictor point of the candidate list to the point P to be encoded is smaller than the threshold Ti. Therein, individual thresholds Ti can be defined according to the distance between the point P and the point Pi of the initial list to be able to sufficiently screening the candidates. Therein, the weight W is preferably fixed for a certain point cloud. Preferably, W is determined according to the density of points of the point cloud, wherein for a sparse point cloud a larger weight W is selected.

Preferably, the weight information W and/or n is included into the bitstream.

Preferably, the bitstream is an MPEG G-PCC compliant bitstream and weight information W and/or n is present in the Attribute Parameter Set (APS) of the G-PCC bitstream.

In an aspect of the present disclosure a method is provided for decoding, from a bitstream, point attributes associated to a point of a point cloud, including:

For a point P to be decoded to the bitstream determining a predictor list of k predictor points of the point cloud including the points of the point cloud nearest to the point P to be decoded which are selected according to their relative position to each other; and decoding the point attributes associated to the point P to be decoded by predictive decoding based on attributes of the predictor points of the predictor list.

Preferably, the method for decoding is further built along with the features described above with respect to the method of encoding. In particular, the process of encoding and decoding are similar. Same method steps can be implemented also for the method for decoding.

In an aspect of the present disclosure an encoder is provided for encoding, in a bitstream, point attributes associated to a point of a point cloud, including: a processor and a memory storage device, wherein in the memory storage device instructions executable by the processor are stored that, when executed, cause the processor to perform the method for encoding described above.

In an aspect of the present disclosure a decoder is provided for decoding, in a bitstream, point attributes associated to a point of a point cloud, including: a processor and a memory storage device, wherein in the memory storage device instructions executable by the processor are stored that, when executed, cause the processor to perform the method described above.

In an aspect of the present disclosure a non-transitory computer-readable storage medium is provided storing processor-executed instructions that, when executed by a processor, cause the processor to perform the method as described above.

The present application describes methods of encoding and decoding attributes of points in a point cloud, and encoders and decoders for encoding and decoding attributes of points in a point cloud.

The present disclosure relates to a method for encoding, in a bitstream, point attributes associated to a point of a point cloud, including:

for a point P to be encoded to the bitstream determining a predictor list of k predictor points of the point cloud including the points of the point cloud nearest to the point P to be encoded which are selected according to their relative position to each other; and encoding the point attributes associated to the point P to be encoded by predictive encoding based on attributes of the predictor points of the predictor list.

Further, the present disclosure relates to a method for decoding, from a bitstream, point attributes associated to a point of a point cloud, including:

for a point P to be decoded to the bitstream determining a predictor list of k predictor points of the point cloud including the points of the point cloud nearest to the point P to be decoded which are selected according to their relative position to each other; and decoding the point attributes associated to the point P to be decoded by predictive decoding based on attributes of the predictor points of the predictor list.

Other aspects and features of the present application will be understood by those ordinary skill in the art from a review of the following description of examples in conjunction with the accompanying figures.

A point cloud is a set of points in a three-dimensional coordinate system. The points are often intended to represent the external surface of one or more objects. Each point has a location (position) in the three-dimensional coordinate system. The position may be represented by three coordinates (X, Y, Z), which can be Cartesian or any other coordinate system. The points have further associated attributes, such as color, which may also be a three-component value in some cases, such as R, G, B or Y, Cb, Cr. Other associated attributes may include transparency, reflectance, a normal vector, etc., depending on the desired application for the point cloud data.

Point clouds can be static or dynamic. For example, a detailed scan or mapping of an object or topography may be static point cloud data. The LiDAR-based scanning of an environment for machine-vision purposes may be dynamic in that the point cloud (at least potentially) changes over time, e.g. with each successive scan of a volume. The dynamic point cloud is therefore a time-ordered sequence of points.

Point cloud data may be used in a number of applications, including conservation (scanning of historical or cultural objects), mapping, machine vision (such as autonomous or semi-autonomous cars), and virtual reality systems, to give some examples. Dynamic point cloud data for applications like machine vision can be quite different from static point cloud data like that for conservation purposes. Automotive vision, for example, typically involves relatively small resolution, non-coloured and highly dynamic point clouds obtained through LiDAR (or similar) sensors with a high frequency of capture. The objective of such point clouds is not for human consumption or viewing but rather for machine object detection/classification in a decision process. As an example, typical LiDAR frames contain on the order of tens of thousands of points, whereas high quality virtual reality applications require several millions of points. It may be expected that there will be a demand for higher resolution data over time as computational speed increases and new applications are found.

While point cloud data is useful, a lack of effective and efficient compression of the attributes and geometry of such a point cloud, i.e. encoding and decoding processes, may hamper adoption and deployment.

One of the more common mechanisms for coding point cloud data is through using tree-based structures. In a tree-based structure, the bounding three-dimensional volume for the point cloud is recursively divided into sub-volumes. Nodes of the tree correspond to sub-volumes. The decision of whether or not to further divide a sub-volume may be based on the resolution of the tree and/or whether there are any points contained in the sub-volume. A leaf node may have an occupancy flag that indicates whether its associated sub-volume contains a point or not. Splitting flags may signal whether a node has child nodes (i.e. whether a current volume has been further split into sub-volumes). These flags may be entropy coded in some cases and in some cases predictive coding may be used. A commonly-used tree structure is an octree. In this structure, the volumes/sub-volumes are all cubes and each split of a sub-volume results in eight further sub-volumes/sub-cubes.

The basic process for creating an octree to code a point cloud may include: Start with a bounding volume (cube) containing the point cloud in a coordinate system:

1. Split the volume into 8 sub-volumes (eight sub-cubes);
2. For each sub-volume, mark the sub-volume with 0 if the sub-volume is empty, or with 1 if there is at least one point in it;
3. For all sub-volumes marked with 1, repeat (2) to split those sub-volumes, until a maximum depth of splitting is reached; and
4. For all leaf sub-volumes (sub-cubes) of maximum depth, mark the leaf cube with 1 if it is non-empty, 0 otherwise.

The tree may be traversed in a pre-defined order (breadth-first or depth-first, and in accordance with a scan pattern/order within each divided sub-volume) to produce a sequence of bits representing the occupancy pattern of each node.

As mentioned above points in the point cloud may include attributes. These attributes are coded independently from the coding of the geometry of the point cloud. Thus, each occupied node, i.e. node including at least one point of the point cloud is associated with one or more attributes in order to further specify the properties of the point cloud.

The present disclosure provides a method for encoding attributes of points of a point cloud in a bitstream. The method is shown in FIG. 1.

In step S01, for a point P to be encoded to the bitstream determining a predictor list of k predictor points of the point cloud including the points of the point cloud nearest to the point P to be encoded which are selected according to their relative position to each other.

In step S02, encoding the point attributes associated to the point P to be encoded by predictive encoding based on attributes of the predictor points of the predictor list.

The present disclosure introduces a mechanism that allows both on the encoding side and the decoding side to replace the list of k nearest predictors for the LoD attribute coding with a different list of k predictors which eventually offer a better prediction (lower residual).

To do so, the present disclosure considers replacing one or more of the k nearest predictor points with "farther" points if their position in space is more favorable, i.e. predictor points are more spread or distributed around the point to be predicted.

Figure 2:
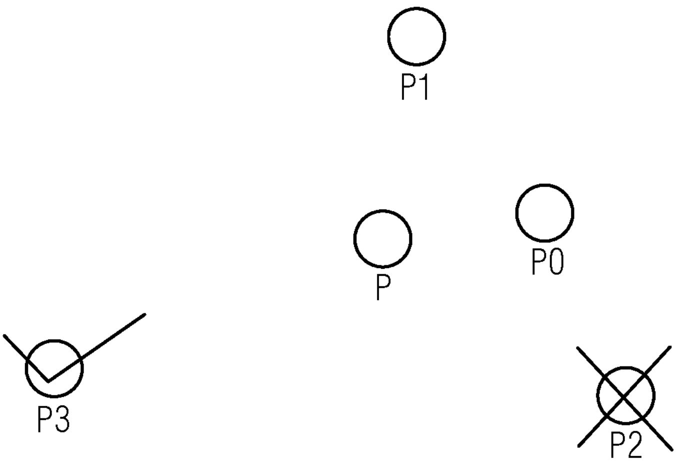
FIG. 2 illustrates a schematic picture of predictor points in a point cloud according to an embodiment.

Referring to FIG. 2 to encode the attributes of point P, it may be preferable to use a farther point indicated by P3 in FIG. 2 instead of the nearer point P2 since the predictor points P0, P1 and P3 are better spread or sufficiently distributed around P than the three nearest predictor points P0, P1 and P2 and thus might provide better prediction of the attributes of point P.

In the following it is referred to the example that 3 predictor points are used for predicting the attributes of the point P to be encoded, i.e. k=3. Of course, the present disclosure is not limited to this number of predictor points being considered. However, usual applications under the MPEG standard use this number of predictors in the LoD prediction schemes since it provides a good compromise between complexity of implementation and accuracy for reduction of the residuals in the bitstream. Thus, in the following examples are given with k=3.

Figure 3:
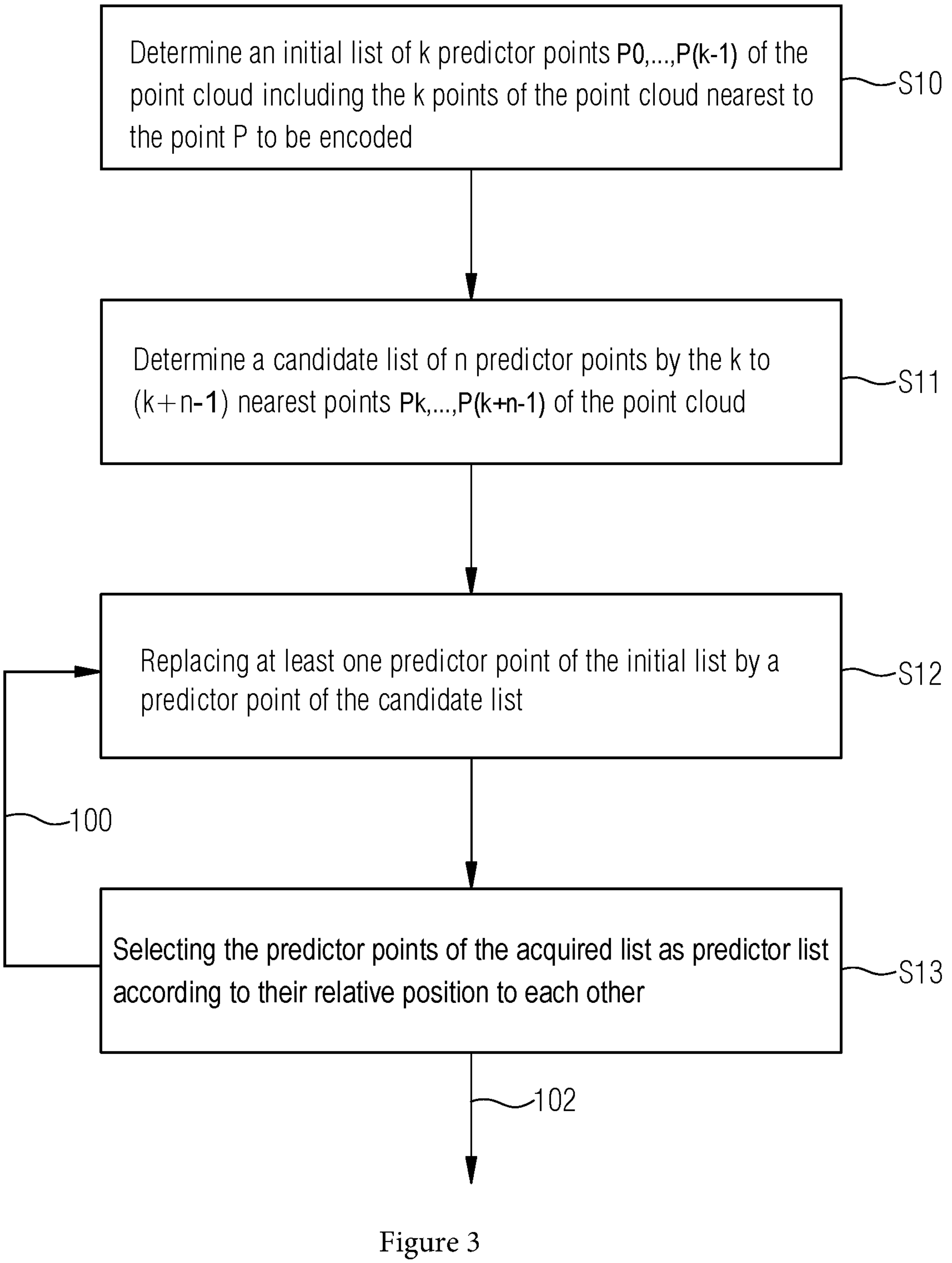
FIG. 3 illustrates a flow diagram of another embodiment of the method according to an embodiment.

Referring to FIG. 3, showing another embodiment according to the present disclosure.

In step S10, an initial list of k predictor points of the point cloud is determined including the k points P0, . . . , P(K−1) of the point cloud nearest to the point P to be encoded.

In step S11, a candidate list of n predictor points is determined by the k to (k+n−1) nearest points Pk, . . . , P(k+n−1) of the point cloud.

In step S12, at least one predictor point of the initial list is replaced by a predictor point of the candidate list to acquire a list of predictor points.

In step S13, selecting the predictor points of the acquired list as predictor list according to their relative position to each other.

Thus, the initial list included those k points of the point cloud which are geographical nearest to the point P to be encoded. The candidate list includes the subsequent n nearest points to the point P to be encoded. The candidate list includes those predictor points which might be considered to acquire a final predictor list which is used for predictive encoding of the attributes of point P. For example k=3, thus, the initial list includes P0, P1 and P2. n might be set equal to 5, thus the candidate list includes the points P3, P4, P5, P6 and P7, wherein P0 to P7 are ordered by increasing distance to the point P to be encoded and are the eight nearest points of the point cloud to the point P to be encoded. According to step S12, at least one predictor point P0, P1 or P2 is replaced by one of the predictor points of the candidate list. Preferably, just one predictor point of the initial list is replaced. Preferably, the last predictor point of the initial list is replaced by one of the predictor points of the candidate list. In the above example P2 might be replaced by one of P3 to P7 to acquire a new predictor points list. Afterwards, according to step S13, the respective predictor list is tested whether their predictor points are spreaded or sufficiently distributed. The predictor points of the new list are selected as predictor list according to their relative position to each other and the predictor list is considered as final predictor list and according to arrow 102 of FIG. 3 used for predictive encoding of the attributes of point P. If the acquired predictor points of the predictor list is not selected, according to arrow 100 of FIG. 3, in an iterative process all predictor points of the candidate list are circled and each tested whether replacing one or more of the predictor points of the initial list by the respective predictor points of the candidate list, results in a predictor point list that is selected on the basis of their relative position to each other and used for predictive encoding 102 for improving prediction of the attributes of point P to be encoded on the basis of the selected predictor points. For example, in a first step point P2 is replaced by P3 and it is tested whether the acquired predictor list (P0, P1, P3) is spreaded. If not, in a next step the predictor list (P0, P1, P4) is tested and so on until either a predictor list is found which is spreaded or reaching the end of the candidate list. In the former, the respective predictor list is selected and used for predictive encoding, while in the latter the initial list might be used.

Figure 4:
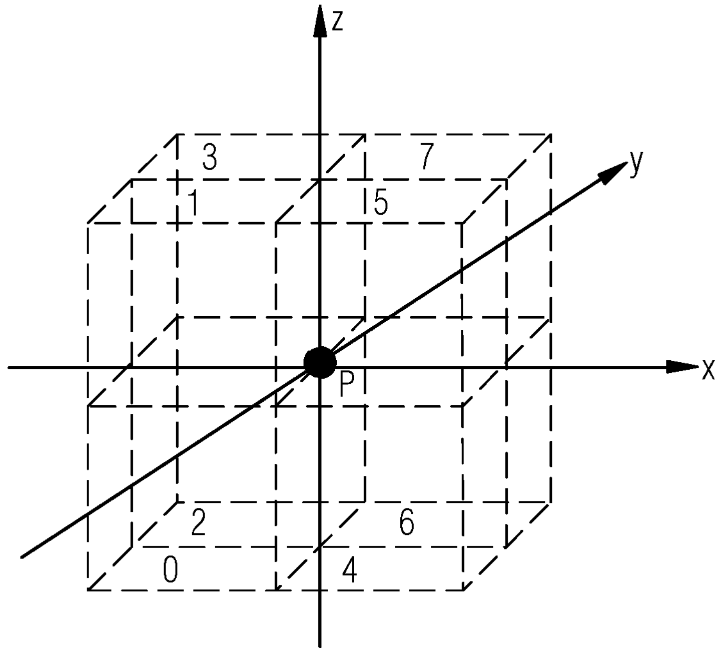
FIG. 4 illustrates an illustration of the special order around point P to be encoded according to an embodiment.

Referring to FIG. 4 depicting the space around point P to be encoded with the axis in the X, Y and Z direction coinciding with the direction of encoding/decoding. Thus, eight octants are defined around point P indicated by 0, . . . , 7. Therein, a list of predictor points is selected if at least two points of the predictor point list are opposite to each other.

This means that strict opposite octants are:

0 and 7;
1 and 6;
2 and 5;
3 and 4.

If such two predictor points are not available, the requirement of the at least two predictor points being opposite if relaxed in that of the predictor points are selected if at least two predictor points need to be loose opposite. Therein, loose opposite octants are defined as if at least two predictor points are located in loose opposite octants, wherein loose opposite octants share only one common edge. This means that loose opposite octants are:

0 and 3,5,6;
4 and 1,2,7;
1 and 2,4,7;
5 and 0,3,6;
2 and 1,4,7;
6 and 0,3,5;
3 and 0,5,6;
7 and 1,2,4.

Figure 5:
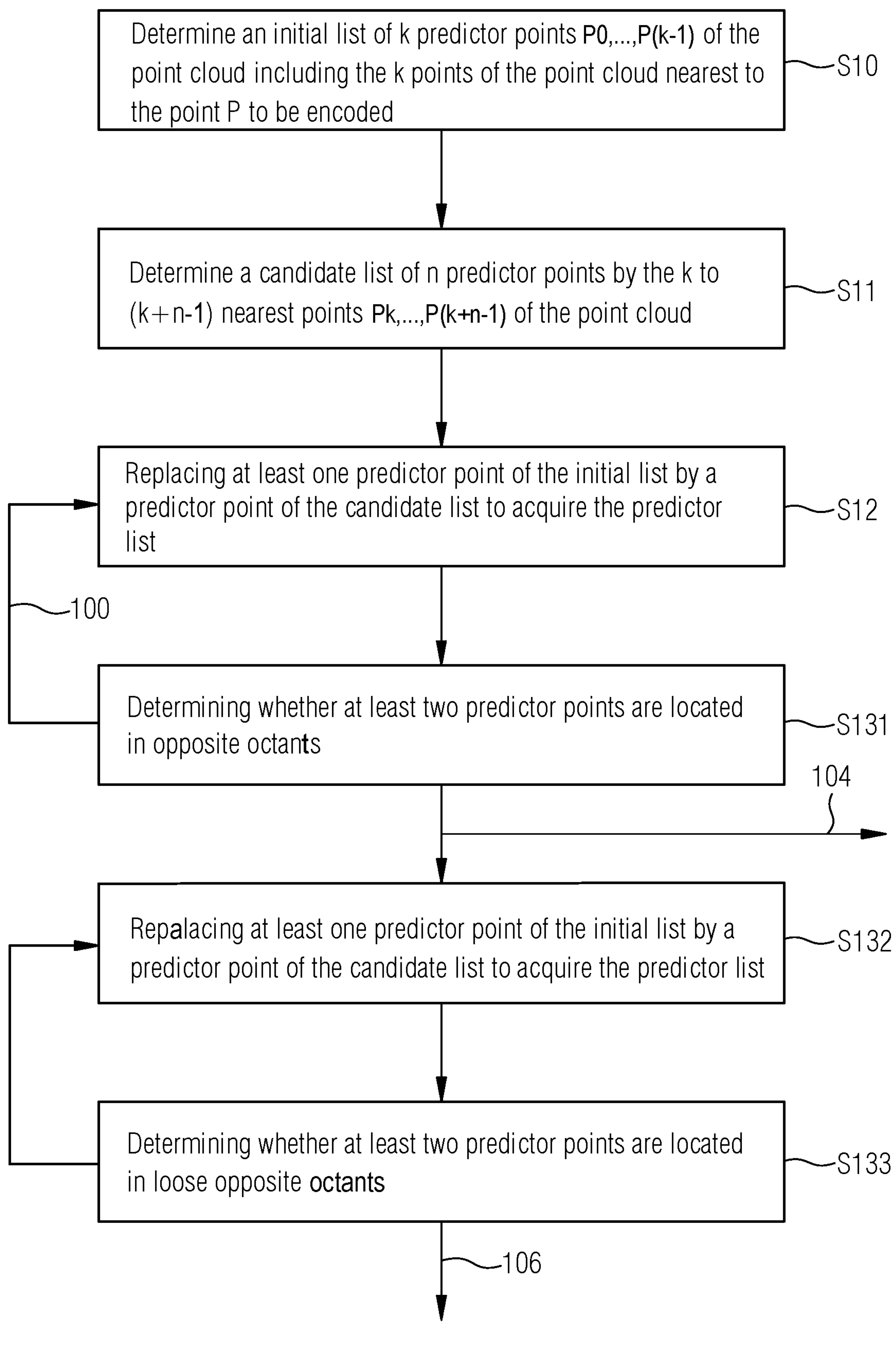
FIG. 5 illustrates a flow diagram of another embodiment of the method according to an embodiment.

Referring to FIG. 5. Therein, steps S10 to S12 are the same as described with reference to FIG. 3.

In step S131, it is determined whether at least two predictor points of the acquired predictor lists are located in opposite octants.

If this is the case, according to arrow 104, the predictor points of the acquired predictor list are considered to be sufficiently distributed around point P to be encoded, i.e. spreaded and selected to be used for predictive encoding.

Otherwise, according to arrow 100, iteratively each element of the candidate list is considered as described above with respect to FIG. 3.

If no predictor points are selected in steps S12 and S131, in step S132 at least one predictor point of the initial list is replaced by a predictor point of the candidate list to acquire the predictor list, similar to step 12 described above.

In step S133, it is determined whether at least two predictor points of the acquired predictor lists are located in loose opposite octants.

If this is the case, according to arrow 106, the predictor points of the acquired predictor list are considered to be sufficiently distributed around point P to be encoded, i.e. spreaded and selected to be used for predictive encoding.

Otherwise, iteratively each element of the candidate list is considered in steps S132 and S133 as described above.

In FIG. 5 it is depicted that first all predictor points of the candidate list are checked whether they provide in the acquired predictor list at least two predictor points which are located in opposite octants and if this fails afterwards all the predictor points in the candidate lists are checked again whether they can provide at least two predictor points which are located in loose opposite octants. However, the order of the steps can be rearranged such that a first predictor point of the candidate list is first tested whether this candidate can provide at least two predictor points being in opposite octants and subsequently the same predictor point of the candidate list is testes for whether it can provide at least two predictor points being at least in two loose opposite octants.

For the example k=3 the steps of the method can be:

1. It identifies an initial list of the 3 nearest predictors P0, P1 and P2 and a candidate list of the n following nearest predictors P3 to Pn+2 to point P.
2. If the predictor points of the initial list is not sufficiently spread around point P, each element of the candidate list will be considered one after another for replacement of last element P2 of the initial list until all elements of the first list are sufficiently spread around point P or there are no more candidates to evaluate. The list of predictors is considered to be sufficiently spread as soon as at least two of the predictor points are in opposite octants to each other.
3. If the process fails to select a list of sufficiently spread elements for the initial list, the whole process is started again but this time predictor points of the candidate list are considered eligible for replacement of P2 if at least two of the predictor points are in loose opposite octants to each other.

Figure 6:
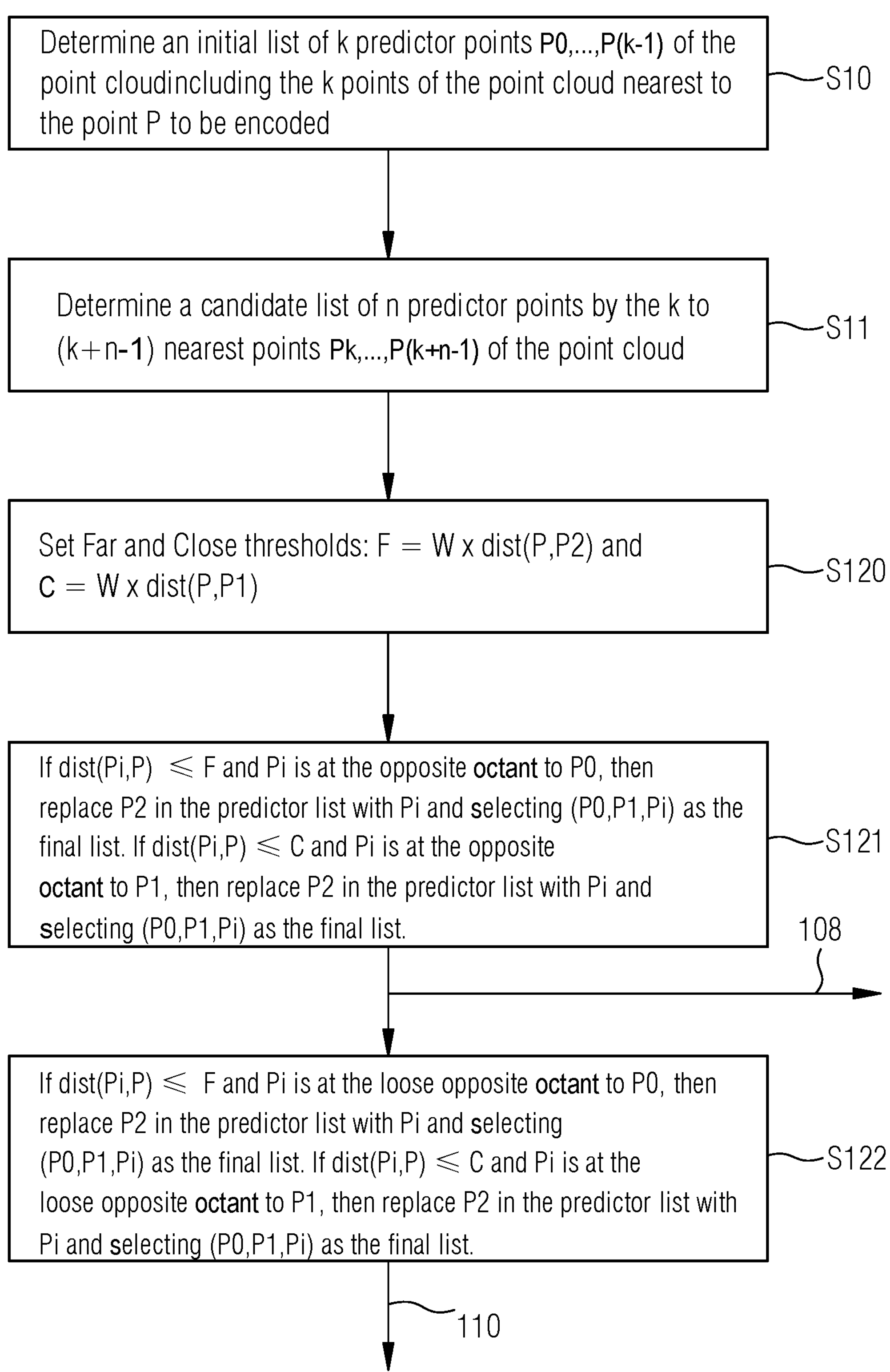
FIG. 6 illustrates a flow diagram of another embodiment of the method according to an embodiment.

Referring to FIG. 6, exemplifying the case of k=3. The eligibility of a predictor point of the candidate list to replace P2 is done by defining two distance thresholds F (far threshold) and C (close threshold) and evaluating the position in space (opposite direction then loose opposite direction) of the respective predictor point of the candidate list with regards to P0 and P1 as long as it is close enough, i.e. under threshold F for P0 and threshold C for P1.

In a preferred embodiment of the invention, the two thresholds are chosen as following:

$$F = W \times dist(P, P2)$$

$$C = W \times dist(P, P1)$$

Where W is a weighting factor to impact the screening of candidates. Weight W might be set in advance and is fixed for a specific point cloud. Since same decision process needs to be done both on encoder side and decoder side, and its results depends on the value of weight W, this value might also be signaled/transmitted with the encoded data in the bitstream.

In a preferred embodiment of the invention for the example of k=3, the following steps are performed on the encoding side:

Steps S10 and S12 are similar as described before and redundant description is omitted here.

In step S120, Far threshold F=W×dist(P,P2) and Close threshold C=W×dist(P,P1) are set.

In an additional optional step, if P1 and P2 are on opposite octants, (P0,P1,P2) is already well spread around P then stop the process and select (P0,P1,P2) as the final predictor list.

In step S121, for each point Pi in the candidate list, in the order of their distance to P:

a. If dist(Pi,P)≤F and Pi is in an opposite octant to P0, then replace P2 in the predictor list with Pi and stop the process by selecting (P0,P1,Pi) as the final predictor list as indicated by arrow 108.
b. If dist(Pi,P)≤C and Pi is in an opposite octant to P1, then replace P2 in the predictor list with Pi and stop the process by selecting (P0,P1,Pi) as the final predictor list as indicated by arrow 108.

In step S122, if at least P1 or P2 are in the same direction as P0, for each point Pi in the list of candidates, in the order of their distance to P:

a. If dist(Pi,P)≤F and Pi is in a loose opposite octant to P0, then replace P2 in the predictor list with Pi and stop the process by selecting (P0,P1,Pi) as the final predictor list.

b. If dist(Pi,P)≤C and Pi is in a loose opposite octant to P1, then replace P2 in the predictor list with Pi and stop the process by selecting (P0,P1,Pi) as the final predictor list.

Otherwise, select (P0,P1,P2) as the final predictor list since no better candidate could be found.

Figure 7:
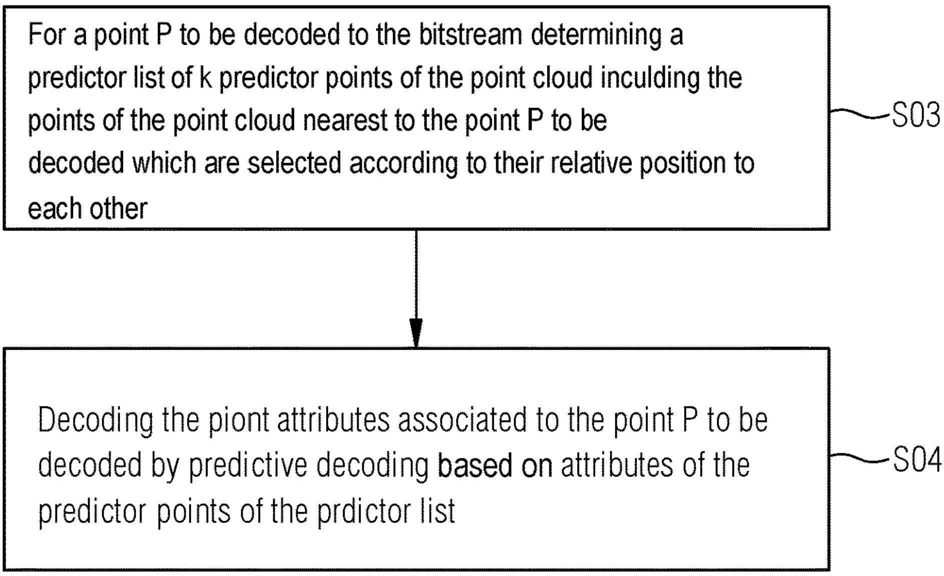
FIG. 7 illustrates a flow diagram for decoding according to an embodiment.

The present disclosure further provides a method for decoding attributes of points of a point cloud in a bitstream. The method is shown in FIG. 7. Referring to FIG. 7, In step S03, For a point P to be decoded to the bitstream a predictor list of k predictor points of the point cloud is determined including the points of the point cloud nearest to the point P to be decoded which are selected according to their relative position to each other.

In step S04, the point attributes associated to the point P are decoded by predictive decoding attributes of the predictor points of the predictor list.

Therein, the method of decoding is built along the features and steps described in connection the method of encoding detailed above.

As long as both W and n values are shared between the encoder and the decoder, the exact same process to elect predictor points can be performed with the same results on both sides. Thus, the method of decoding has the additional step of reading W (weight for the distance eligibility) and n (maximum number of candidates) values from the coded point cloud bitstream. Following steps are then identical to the method of encoding described in full detail above.

In a preferred embodiment of the invention, weight W and n parameter values are signaled within the Attribute Parameter Set (APS) of an MPEG G-PCC coded point cloud.

Figure 8:
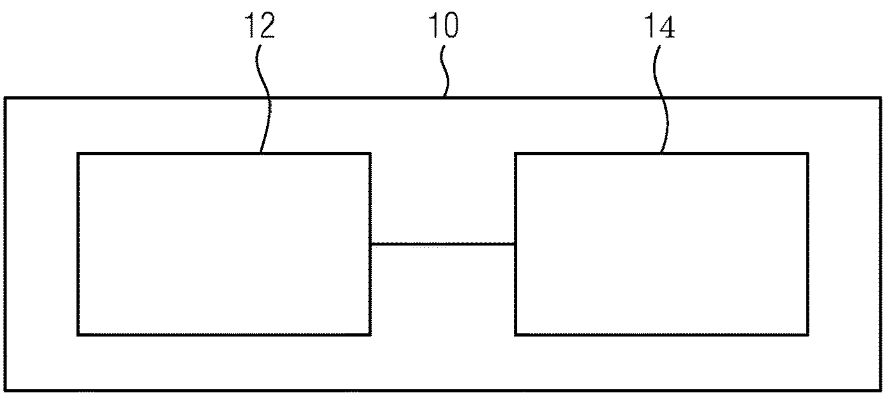
FIG. 8 illustrates an encoder according to an embodiment.

Reference is now made to FIG. 8, which shows a simplified block diagram of an example embodiment of an encoder 10. The encoder 10 includes a processor 12 and a memory storage device 14. The memory storage device 14 may store a computer program or application containing instructions that, when executed, cause the processor 12 to perform operations such as those described herein. For example, the instructions may encode and output bitstreams encoded in accordance with the methods described herein. It will be understood that the instructions may be stored on a non-transitory computer-readable medium, such as a compact disc, flash memory device, random access memory, hard drive, etc. When the instructions are executed, the processor 12 carries out the operations and functions specified in the instructions so as to operate as a special-purpose processor that implements the described process(es). Such a processor may be referred to as a "processor circuit" or "processor circuitry" in some examples.

Figure 9:
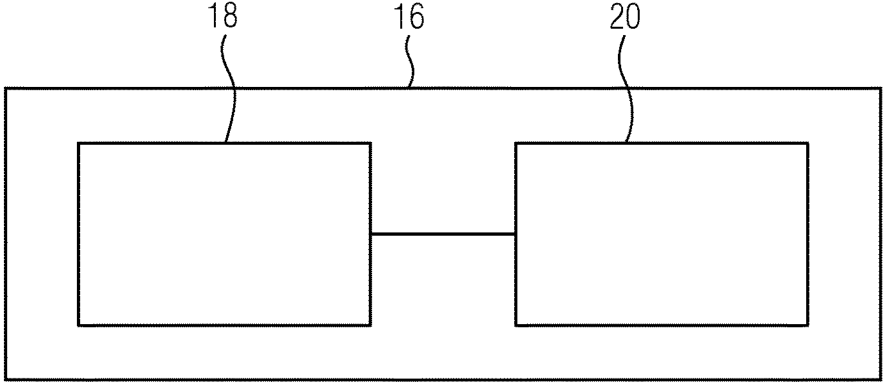
FIG. 9 illustrates a decoder according to an embodiment.

Reference is now also made to FIG. 9, which shows a simplified block diagram of an example embodiment of a decoder 16. The decoder 16 includes a processor 18 and a memory storage device 20. The memory storage device 20 may include a computer program or application containing instructions that, when executed, cause the processor 18 to perform operations such as those described herein. It will be understood that the instructions may be stored on a computer-readable medium, such as a compact disc, flash memory device, random access memory, hard drive, etc. When the instructions are executed, the processor 18 carries out the operations and functions specified in the instructions so as to operate as a special-purpose processor that implements the described process(es) and methods. Such a processor may be referred to as a "processor circuit" or "processor circuitry" in some examples.

It will be appreciated that the decoder and/or encoder according to the present application may be implemented in a number of computing devices, including, without limitation, servers, suitably programmed general purpose computers, machine vision systems, and mobile devices. The decoder or encoder may be implemented by way of software containing instructions for configuring a processor or processors to carry out the functions described herein. The software instructions may be stored on any suitable non-transitory computer-readable memory, including CDs, RAM, ROM, Flash memory, etc.

It will be understood that the decoder and/or encoder described herein and the module, routine, process, thread, or other software component implementing the described method/process for configuring the encoder or decoder may be realized using standard computer programming techniques and languages. The present application is not limited to particular processors, computer languages, computer programming conventions, data structures, other such implementation details. Those skilled in the art will recognize that the described processes may be implemented as a part of computer-executable code stored in volatile or non-volatile memory, as part of an application-specific integrated chip (ASIC), etc.

The present application also provides for a computer-readable signal encoding the data produced through application of an encoding process in accordance with the present application.

Certain adaptations and modifications of the described embodiments can be made. Therefore, the above discussed embodiments are considered to be illustrative and not restrictive. In particular, embodiments can be freely combined with each other.

The invention claimed is:

1. A method for encoding, in a bitstream, point attributes associated to a point of a point cloud, comprising:

determining, for a point P to be encoded to the bitstream, a predictor list of k predictor points of the point cloud including k points of the point cloud nearest to the point P to be encoded, wherein the k points are selected according to their relative position to each other; and encoding the point attributes associated to the point P to be encoded by predictive encoding based on attributes of the predictor points of the predictor list;

wherein determining the predictor list comprises:

determining an initial list of k predictor points P0 . . . , P(k−1) of the point cloud including the k points of the point cloud nearest to the point P to be encoded; and selecting the predictor points of the initial list as the predictor list according to their relative position to each other;

wherein the space around the point P to be encoded is separated into octants along the X, Y, and Z-axis of encoding/decoding, wherein the predictor points are selected if at least two predictor points are located in strict opposite octants, wherein the strict opposite octants share only the common point P to be encoded.

2. The method according to claim 1, further comprising:

determining a candidate list of n predictor points by k to k+n−1 nearest points Pk, . . . , P(k+n−1) of the point cloud;

replacing at least one predictor point of the initial list by a predictor point of the candidate list to acquire a predictor list; and selecting predictor points of the acquired predictor list as a predictor list according to their relative position to each other.

3. The method according to claim 2, wherein only a last predictor point of the initial list and/or the predictor list is replaced.

4. The method according to claim 1, further comprising:

iteratively replacing at least one predictor point by each predictor point of a candidate list to acquire a predictor list until predictor points of the predictor list are selected.

5. The method according to claim 1, wherein k is equal to or larger than 3.

6. The method according to claim 1, wherein the space around the point P to be encoded is separated into octants along the X, Y, and Z-axis of encoding/decoding, wherein the predictor points are selected if at least two predictor points are located in loose opposite octants, wherein loose opposite octants share only one common edge.

7. The method according to claim 1, wherein selecting the predictor points of the initial list and/or the predictor list comprises:

determining whether at least two predictor points are located in opposite octants and subsequently determining whether at least two predictor points are located in loose opposite octants.

8. The method according to claim 1, wherein at least one threshold Ti is defined by Ti=W×dist(P, Pi), with a weight W>1 and Pi a predictor point of the initial list, wherein predictor points of the candidate list are eligible for replacing the at least one predictor point of the initial list if the distance between the predictor point of the candidate list to the point P to be encoded/decoded is smaller than Ti.

9. The method according to claim 8, wherein the weight W and/or n is included into the bitstream.

10. The method according to claim 8, wherein the bitstream is an MPEG G-PCC compliant bitstream and the weight W and/or n is present in the Attribute Parameter Set, APS, of the G-PCC bitstream.

11. An encoder for encoding, in a bitstream, point attributes associated to a point of a point cloud, comprising: a processor and a memory storage device, wherein in the memory storage device instructions executable by the processor are stored that, when executed, cause the processor to perform the method according to claim 1.

12. A method for decoding, from a bitstream, point attributes associated to a point of a point cloud, comprising:

determining, for a point P to be decoded to the bitstream, a predictor list of k predictor points of the point cloud including k points of the point cloud nearest to the point P to be decoded, wherein the k points are selected according to their relative position to each other; and decoding the point attributes associated to the point P to be decoded by predictive decoding based on attributes of the predictor points of the predictor list;

wherein determining the predictor list comprises:

determining an initial list of k predictor points P0 . . . , P(k−1) of the point cloud including the k points of the point cloud nearest to the point P to be encoded; and selecting the predictor points of the initial list as the predictor list according to their relative position to each other;

wherein the space around the point P to be encoded is separated into octants along the X, Y, and Z-axis of encoding/decoding, wherein the predictor points are selected if at least two predictor points are located in strict opposite octants, wherein the strict opposite octants share only the common point P to be encoded.

13. The method according to claim 12, further comprising:

determining a candidate list of n predictor points by k to k+n−1 nearest points Pk, . . . , P(k+n−1) of the point cloud;

replacing at least one predictor point of the initial list by a predictor point of the candidate list to acquire a predictor list; and selecting predictor points of the acquired predictor list as a predictor list according to their relative position to each other.

14. The method according to claim 12, further comprising:

iteratively replacing at least one predictor point by each predictor point of a candidate list to acquire a predictor list until predictor points of the predictor list are selected.

15. The method according to claim 2, wherein only a last predictor point of the initial list and/or the predictor list is replaced.

16. The method according to claim 12, wherein at least one threshold Ti is defined by Ti=W×dist(P, Pi), with a weight W>1 and Pi a predictor point of the initial list, wherein predictor points of the candidate list are eligible for replacing the at least one predictor point of the initial list if the distance between the predictor point of the candidate list to the point P to be encoded/decoded is smaller than Ti.

17. A decoder for encoding, in a bitstream, point attributes associated to a point of a point cloud, comprising: a processor and a memory storage device, wherein in the memory storage device instructions executable by the processor are stored that, when executed, cause the processor to perform the method according to claim 12.

* * * * *